Feb. 28, 1967  L. A. WIMMER  3,306,097
APPARATUS FOR TESTING CANS
Filed May 24, 1965  3 Sheets-Sheet 1
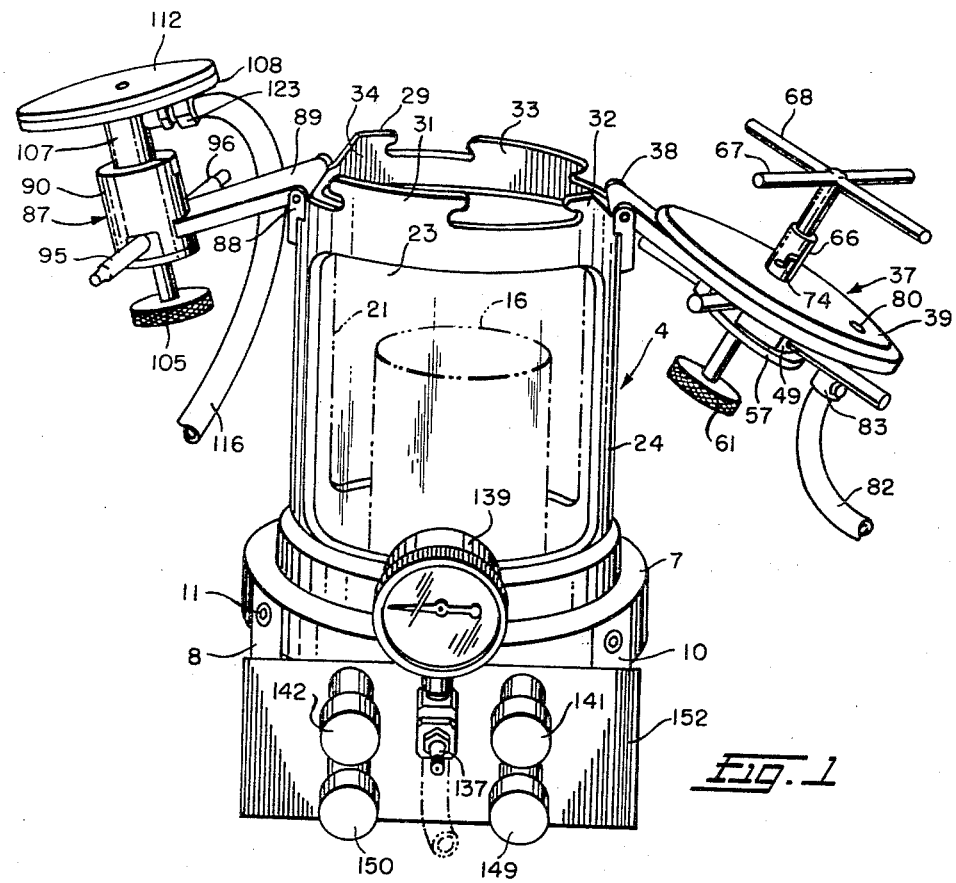
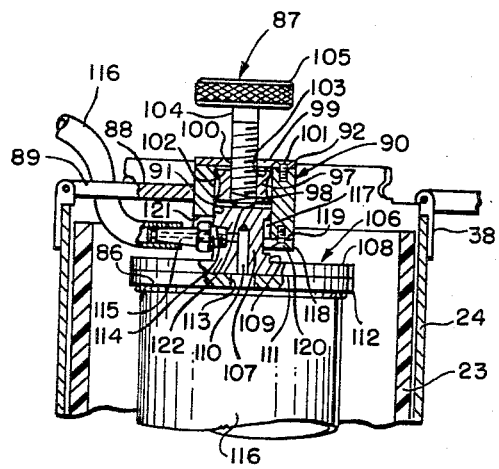
INVENTOR
LENIFORD A. WIMMER
BY *Schramm, Kramer & Sturges*
ATTORNEYS Feb. 28, 1967  L. A. WIMMER  3,306,097
APPARATUS FOR TESTING CANS
Filed May 24, 1965  3 Sheets-Sheet 2
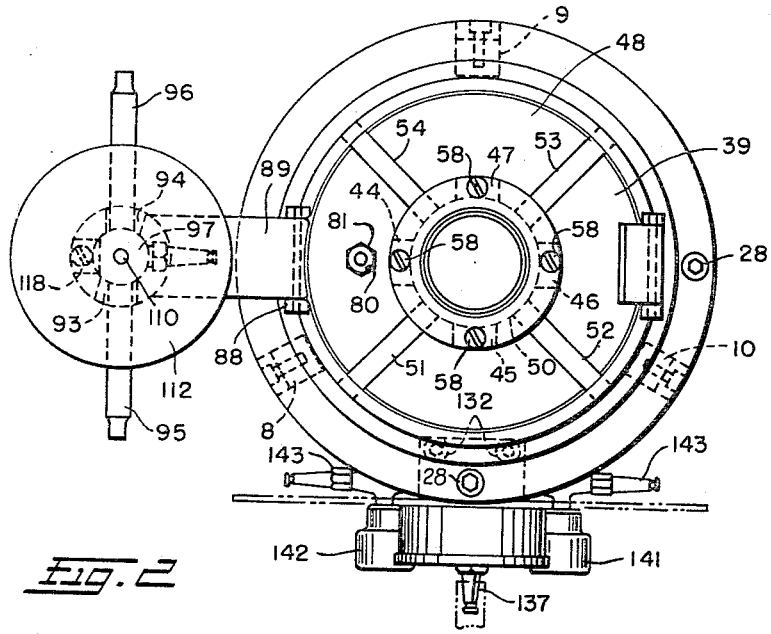
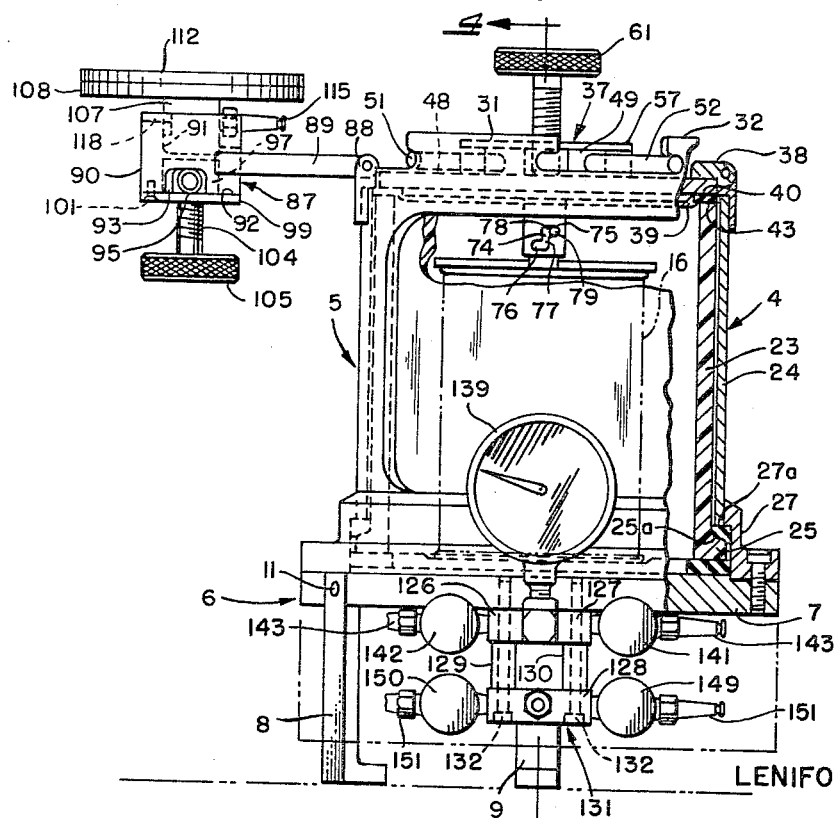
INVENTOR
LENIFORD A. WIMMER
BY Schramm, Reamer & Stenger
ATTORNEYS Feb. 28, 1967 L. A. WIMMER 3,306,097
APPARATUS FOR TESTING CANS
Filed May 24, 1965 3 Sheets-Sheet 3

INVENTOR
LENIFORD A. WIMMER

BY *Schramm, Hsmes & Stewger*

ATTORNEYS 3,306,097
APPARATUS FOR TESTING CANS
Lenford A. Wimmer, Chicago, Ill., assignor to
Sherwin-Williams, a corporation of Ohio
Filed May 24, 1965, Ser. No. 458,034
14 Claims. (Cl. 73—49.2)

This invention relates to an apparatus for testing metallic containers, and more particularly to testing apparatus for applying differential fluid pressures to the interior and exterior of metal containers.

In the production of metal containers, such as paint cans, it is necessary to sample the production line from time to time to select containers for testing purposes to determine whether or not the line is functioning properly. These lines normally travel at rates ranging from 60 to 400 cans per minute. Consequently, there is a need for rapid determination of the fitness of the sample can in order to detect faulty construction at the earliest possible moment. Also, in receiving containers from a manufacturer, the purchaser may also wish to spot check samples of the containers for the purpose of satisfying himself that the supplier has furnished containers pursuant to specifications issued by the purchaser.

The present invention provides, therefore, a simple, inexpensive, easily operated container testing apparatus which enables rapid testing of containers under a variety of differential pressure conditions, both liquid and gas. Included among the tests which may be performed on the apparatus of this invention are the following:

(1) Creating pressure or vacuum on the outside of a sealed can, and recording any variations in the pressure or vacuum which indicates, for example, faulty seams;

(2) Creating pressure or vacuum on the inside of a sealed can, and similarly recording any variations thereof;

(3) Submerging a sealed can in liquid such as water, applying pressure to the inside of the can, and visually noting any bubbles rising in the water, such bubbles indicating leakage;

(4) Submerging a sealed can in water and creating a vacuum on the water, which, if the can is defective, will pull air from inside the can into the water causing bubbles therein, which may be visually observed; and (5) Submerging a sealed can in water and creating a vacuum or pressure on the water, and similarly recording variations thereof which indicate leakage.

In performing any of the above mentioned tests, the configuration of the can is also tested for the can will collapse under such pressure or vacuum if its design or construction is faulty.

Performance of so many different tests incites visions of large cumbersome equipment. Yet, this apparatus, because of its ingenuity of design, is relatively simple and compact. Because of this, the previously mentioned tests are readily performed with a minimum of effort. Such design, also allows the apparatus to be economically manufactured and sold.

Although the following description is given in reference to an apparatus for testing one can at a time, it should be understood that the principles herein disclosed may be applied to an apparatus for simultaneously testing a plurality of cans.

Briefly stated, the present invention is in a testing apparatus of devices for metallic containers comprising in combination a base which is adapted to support a metallic container undergoing testing, and a chamber mounted on the base of sufficient size and design to receive a metallic container to be tested. A hermetically sealable cover for the chamber is provided, which cover is hinged to one side of the top edge of the chamber. There is also provided a second cover which is hermetically sealable to the metallic container in place of the cover normally used therewith. This second or test cover is also hinged to the top marginal edge of the test chamber. Means are then provided for applying differential fluid pressure between the interior of the container and the interior of the test chamber. Combinations of fluids, e.g., liquids or gases, by which various characteristics of the container undergoing testing may be determined, may be supplied either within the confines of the container, within the space between the walls of the container and the walls of the test chamber, or both, as may be desired. Different fluids may be used in each of the aforesaid confining spaces. Thus, any of the conditions enumerated above may be fulfilled in a single piece of apparatus by manipulation of valves and the two hinged covers enabling rapid determination of the properties of selected testing containers.

The invention and its following description will become more apparent by having reference to the attached drawings, wherein:

FIG. 1 is a perspective view of the can testing apparatus of this invention;

FIG. 2 is a top view of the apparatus;

FIG. 3 is a side view of the apparatus showing in particular the valving arrangement for filling and draining liquid from the apparatus, and for creating air pressure and vacuum upon the cans tested, and also showing a cutaway portion of the apparatus;

FIG. 5 is a fragmentary cross-sectional view illustrating a closure cap in sealing coaction with an open end of a can placed in the can testing apparatus.

*Fluid tight receptacle for holding cans*

Figure 4:
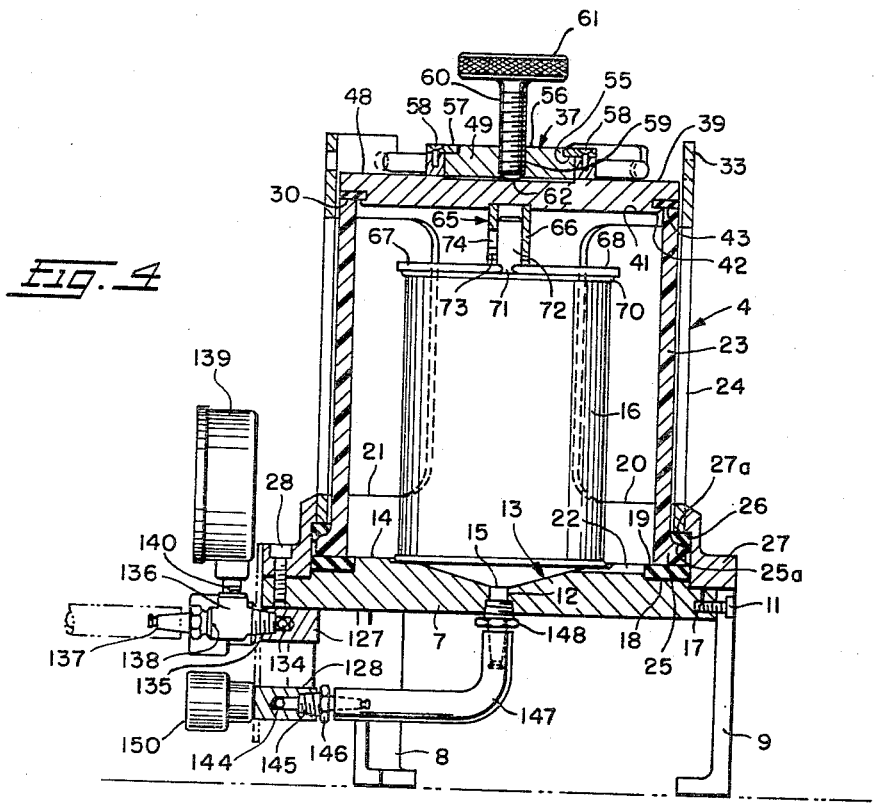
FIG. 4 is a cross-sectional view of the apparatus taken in the plane indicated by the line 4—4 of FIG. 3.

Referring generally to FIGS. 1–5 of the annexed drawings and more particularly to FIGS. 3 and 4, there is shown an apparatus for testing cans, generally indicated at 4. The apparatus 4 comprises a chamber or receptacle, generally indicated at 5, secured to a base, generally indicated at 6.

The base 6 comprises an annular plate or disc 7, having a plurality of legs, e.g. legs 8, 9 and 10, secured thereto by any suitable means, e.g. cap screws 11. A hole or passageway 12 is centrally disposed in the plate 7. A centrally disposed sloped drain 13 is formed in the surface 14 of the plate 7, and has its lowest drainage point 15 in communication with the passageway 12. As seen in FIG. 4, a can 16 placed within the receptacle 5 rests in the drain 13. A pair of adjacent annular stepped recesses 17 and 18 are formed in plate surface 14 adjacent the outer periphery of plate 7. Recess 18 is designed to receive an annular sealing gasket 19. A plurality of radially extending drainage channels, e.g. channel 22, are formed in the surface 14, and communicate with the drain 13. One of the tests previously mentioned was placing a sealed can in the receptacle and submerging it in water. Channels 22 facilitate draining the water from the receptacle 5.

As previously indicated, the receptacle 5 must be impervious to fluids and/or liquids, and must contain transparent means for observing a can placed in the receptacle. This may be accomplished in any suitable manner; for example, a metal casing with glass inserts may be used. In the embodiment shown; however, an elongated, transparent, e.g. Pyrex, tubular body 23 is mounted on the gasket 19. The tubular body 23 is surrounded by a rigid casing 24 formed from any suitable material, e.g. metal or plastic.

The casing 24 coacts with the tubular body 23 to hold it in position on the gasket 19. An annular flange 25 is secured to the tubular body 23 adjacent the gasket 19 forming a shoulder 25a therebetween. An annular cushioning gasket 26 is disposed on the shoulder 25a. An L-shaped collar 27 is secured to the end of the casing 24 adjacent shoulder 25, forming a shoulder 27a thereat. The collar 27 with attached casing 24 is mounted to the base 7 in the recess 17 by any suitable means, e.g. a plurality of circumferentially spaced bolts 28. As the collar 27 is tightened to the plate 7, shoulder 27a exerts pressure against gasket 26, which in turn exerts pressure against shoulder 25a holding the transparent tubular body 23 firmly in position on the gasket 19.

The free end 29 of the casing 24 is open and extends beyond the free end 30 of the transparent cylinder 23. A plurality of circumferentially spaced locking latches, e.g. latches 31, 32, 33 and 34 are formed in the free casing end 29.

A portion of the casing 24 is removed to permit viewing the can 16 within the receptacle 5. In the embodiment shown, two cut-away portions or windows 20 and 21, respectively, are provided for observing the can 16 within the transparent cylinder 23. The windows 20 and 21 are necessary to perform the water test as previously indicated.

*Lid for sealing the receptacle*

A lid for sealing the open end of the receptacle 5, is generally indicated at 37. Lid 37 is pivotally mounted to the open end of the receptacle 5 by any suitable means, e.g. hinge 38. Any suitable lid which seals the open end of the receptacle 5, and provides lateral support for the can 16 placed therein, may be used. In the embodiment shown, the lid 37 comprises an annular disc or plate 39, whose outside diameter is greater than the inside diameter of the transparent cylinder 23, but less than the inside diameter of the casing 24.

In FIG. 4, disc 39 is shown in sealing coaction with the open end 30 of cylinder 23. An annular recess 40 is formed in disc surface 41 adjacent its outer periphery. In forming the recess 40, an annular lip 42 is provided to overlap a portion of the recess 40. The recess 40 is designed to receive an annular sealing gasket 43, which is held in position in the recess 40 by the overlapping annular lip 42. When the lid 37 is closed, the gasket 43 is in sealing contact with the open end 30 of the transparent cylinder 23.

A plurality of studs 44, 45, 46 and 47 are secured to and extend from the opposite disc face or surface 48. The studs 44, 45, 46 and 47 (FIG. 2) are equally distant from and equally spaced around the center of the disc 39. The studs 44, 45, 46 and 47 are disposed on the disc 39 in predetermined annular spaced relation to the locking latches formed in the casing end 29. The reason for this will become apparent as the description proceeds.

A circular clamp body or disc 49 is mounted for rotation within the studs 44, 45, 46 and 47. The surfaces of the studs adjacent the clamp or body 49, i.e. surface 50 of stud 45, are formed on a radius which is slightly larger than the radius of the clamp body 49.

A plurality of clamp rods, e.g. rods 51, 52, 53 and 54, are secured to and radially extend from the clamp body 49. The rods are equally spaced along the outer surface of the clamp body 49 in predetermined relation to the latches on casing end 29. As seen in FIG. 2, each clamp rod radiates from the clamp body 49, between adjacent pairs of studs. This is done to permit limited rotation of the rods between the studs, whereby each rod becomes engaged and locked in a corresponding locking latch disposed on the free casing end 29. An annular recess 55 is formed in the clamp body surface 56 adjacent its outer periphery.

As seen in FIG. 4, the recess 55 is designed to receive a collar 57, which is secured to the free ends of the studs by any suitable means, e.g. machine screws 58. The collar 57 keeps the clamp body 49 locked within the studs while allowing it to rotate. A hole or opening 59 is centrally disposed in and extends through the clamp body 49. Hole 59 is threaded to receive the threaded shank 60 of a knob 61.

The knob 61 is used to tighten the seal between the lid 37 and the open end 30 of the transparent cylinder 23. After the plate 39 is rotated into sealing engagement with cylinder end 30, and the clamp rods placed or swung into interlocking engagement with the locking latches on the casing 24, the knob 61 is rotated until its end 62 engages the plate 39. Further tightening of the knob 61, forces the plate 39 to compress the sealing gasket 43 against the free end or rim 30 of the transparent cylinder 23.

It is desirable to provide some lateral support for the can 16 within the receptacle 5. This is accomplished by providing an adjustable tensioning head 65 which coacts with the can 16 to hold it firmly in position (FIG. 4). In the embodiment shown the adjustable head 65 comprises a hollow cylinder 66 having one end secured to disc surface 41. The cylinder 66 is preferably centrally disposed on the disc 39.

A plurality of radially extending rods or arms, e.g. rods 67 and 68, for engaging the top 70 of the can 16 are secured to the end 71 of cylindrical shank portion 72 and radiate therefrom in a plane transverse to the longitudinal axis of shank portion 72. The shank portion 72 is insertable in the hollow cylinder end 73 and adjustable within the hollow cylinder 66 for engaging different size cans. Any suitable means may be used to adjust the shank portion 72 in the hollow cylinder. For example, the shank portion 72 may be threadably engaged in the cylinder 66 and rotated to and from the cylinder 66. In the embodiment shown, however, the tensioning head 65 is provided with two adjustments for stabilizing coaction with two conventionally designed cans, e.g. cans presently bearing stock numbers 504 and 508.

An adjusting slot 74 is formed in the cylinder 66. Slot 74 defines two spaced apart pin receiving recesses 75 and 76, which are connected by adjoining slot 77. A hole or opening 78 is formed in the shank 72. Hole 78 is designed to receive a pin 79 which is alternately received in the recesses 75 and 76, respectively, providing two adjustments for the tensioning head 65. A hole or opening 80 extends transversely through the plate 39. A hose connection 81 (FIG. 2) is secured within the opening 80. A piece of resilient tubing or hose 82 is secured to the hose connection 81 by any suitable means, e.g. hose clamp 83 (FIG. 1).

*Cap for sealing the open end of a can being tested in the receptacle*

A lid or closure cap for sealing the open end 86 of a can placed in the receptacle 5, is generally indicated at 87. Cap 87 is also pivotally mounted to the open end of the receptacle 5 by any suitable means, e.g. hinge 88. Hinges 38 and 88 are, preferably, oppositely disposed on the casing end 29. Cap 87 when closed, is preferably centrally disposed in the receptacle 5 (FIG. 5). This is accomplished by securing the cap 87 to an elongated hinge arm 89.

Cap 87 comprises a cylinder 90 with a centrally disposed longitudinally extending bore 91. The longitudinal axis of cylinder 90 is at right angles to the plane of the arm 89. The outer cylinder end 92, i.e. the end farthest from the can when the closure cap is in closed sealing coaction therewith, has formed therein a pair of oppositely disposed U-shaped notches 93 and 94. Notches 93 and 94 are designed to receive for limited rotational movement therein, a pair of oppositely disposed rods or arms 95 and 96, respectively, radiating from and secured to clamp body 97.

Clamp body 97 is provided with a threaded bore or opening 98. The clamp body 97 with its radiating arms 95 and 96 form a clamping assembly for interlocking coaction with the latches 31 and 33 formed in casing end 29. Arms 95 and 96 rest in the notches 93 and 94, respectively, and support clamp body 97 in the bore 91.

A cover plate 99 having a centrally disposed opening 100 is secured to cylinder end 92 by any suitable means, e.g. machine screws 101. Openings 98 and 100 are in aligned relation. As seen in FIG. 5 when the clamping assembly is in position, clamp body surface 102 abuts adjacent cover plate surface 103. A threaded shank 104 of knob 105 is inserted through opening 100 and threadably engaged in bore 98.

An adjustable sealing head for sealing the open end 86 of can 16 is generally indicated at 106. Head 106 is adjustable in the cylinder bore 91. Head 106 comprises a cylindrical body 107 which is slidable in the bore 91. A disc 108, having a diameter at least equal to the outer diameter of can 16, is secured to and integral with cylinder end 109. Disc 108 is at right angles to the longitudinal axis of body 107. A centrally disposed hole or passageway 110 extends from the disc surface 111 into the cylinder body 107. A resilient sealing disc or gasket, e.g. rubber, is secured to disc surface 111 by any suitable means, e.g. glue or adhesive. Gasket 112 and disc 108 preferably have the same diameters. Gasket 112 has a centrally disposed hole 113 which is aligned with passageway 110.

A passageway 114 transverse to the passageway 110 is formed in the cylinder body 107 and communicates with the passageway 110. A hose connection 115 is secured to and communicates with passageway 114. A piece of resilient tubing or hose 116 is secured to the hose connection by any suitable means, e.g. hose clamp 123 (FIG. 1). A longitudinal recess 117 is formed in the outer surface of the cylindrical body 107. A key 118 is secured to the other cylinder end 119 by any suitable means, e.g. machine screw 120. Key 118 extends into the recess 117 and keeps the cylinder body 107 in the bore 91. A U-shaped notch 121 is also formed in the cylinder end 119 adjacent the passageway 114, to permit limited movement of the hose connection 115.

The seal is effected between the can 16 and the closure cap 87 by rotating the cap 87 into sealing coaction with the can's open end 86. The clamping assembly is then rotated to engage the locking latches on the casing 24. The knob 105 which is threadably engaged in bore 98 is tightened by rotating the shank 104 into the bore 98. The shank end 122 exerts pressure against the cylinder body 107, which in turn compresses the sealing gasket 112 between the disc 108 and the open can end 86.

Control valves

The valves for controlling fluid, e.g. air, pressure and vacuum, and for controlling the flow of liquids, e.g. water, to and from the apparatus are disposed within the base 6 between the base plate 7 and the free ends of the legs 8, 9, and 10. This is shown more clearly in FIGS. 3 and 4. A pair of similar elongated bars 127 and 128 having similar T-shaped passageways are secured to a pair of parallel spaced bars 129 and 130 in parallel spaced apart relation. This valve structure generally indicated at 131 is secured to the base plate 7 by any suitable means, e.g. elongated bolts 132.

A longitudinal passageway 134 and an intersecting passageway 135 are formed in the bar 127. Passageway 135 extends from bar surface 126 and communicates with passageway 134. Passageway 135 is threaded to receive a T-fitting 136. A hose connection 137 is threadably engaged in the T end 138. A conventionally designed gauge 139 for recording pressure and vacuum is fitted to the remaining T end 140. The ends of passageway 134 are threaded to receive seal valves 141 and 142, respectively. Similar hose connections 143 are threadably secured to the valves 141 and 142. Resilient tubing or hose (not shown) is secured to each hose connection by hose clamps similar to hose clamp 83. The tubing is connected to conventionally designed equipment, e.g. pumps (not shown), for creating pressure and vacuum. Valves 141 and 142 are used to control pressure and vacuum alternately created in the receptacle and can in the receptacle, respectively.

The tubing or hoses 82 and 116 connected to the lid 37 and closure cap 87, respectively, are alternately connected to hose connection 137. Hose connection 137 acts as an inlet port through which vacuum and pressure are created in the receptacle 5 and can 16, respectively. When lid 37 is in sealing coaction with the open end of receptacle 5 and the free end of tubing 82 connected to hose connection 137, pressure or vacuum can alternately be created in the receptacle 5. Alternately, if closure cap 87 is in sealing coaction with can 16 placed in the receptacle 5, and the free end of tubing 116 is secured to hose connection 137, pressure or vacuum can be created within the can 16.

Bar 128 is similarly constructed having a longitudinal passageway 144 and an intersecting passageway 145 at right angles thereto and in communication therewith. A hose connection 146 is secured to and communicates with passageway 145. A piece of resilient tubing or hose 147 is secured to the hose connection 146 by any suitable means, e.g. conventionally designed hose clamps (not shown). The free end of the tube 147 is secured to a hose connection 148 by any suitable means, e.g. conventionally designed hose clamps (not shown). Hose connection 148 is secured to and communicates with passageway 12 leading from the sloped drain 13. A pair of valves 149 and 150 are similarly connected to the ends of passageway 144, and are used to regulate the flow of liquid to and from the cylinder 23. Hose connections 151 are similarly connected to valves 149 and 150, respectively. Resilient tubing (not shown) in connected to the connections 151 and lead to a source of liquid supply and drain, respectively. Thus, the valves 149 and 150 are used to alternately fill and drain the receptacle 5.

A cover plate 152 is secured to the valve assembly 131. Plate 152 covers the hose connections and provides a more aesthetic appearance for the can testing apparatus 4 (FIG. 1). Indicia, describing the various valves, e.g. pressure, vacuum, water inlet and water outlet, may be placed on plate 152 adjacent each respective valve.

Thus, there has been provided a new and novel apparatus for testing cans. The apparatus may be used to perform a plurality of tests as previously indicated.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and claimed as the invention:

1. A testing device for containers comprising:
   (a) a base for supporting a container;
   (b) a fluid tight receptacle surrounding the container and mounted to the base, the end of the receptacle farthest from the base being open;
   (c) means disposed on the open end of the receptacle for sealing it;
   (d) means disposed on the open end of the receptacle for sealing an open end of a container placed therein; and
   (e) means coacting with the receptacle for applying differential fluid pressure between the interior of a container therein, and this interior of the receptacle.

2. An apparatus for testing cans comprising:
   (a) a fluid tight receptacle for holding a can therein;
   (b) means coacting with the receptacle for supplying liquid thereto and draining it therefrom;
   (c) means coacting with the receptacle for alternately supplying fluids under pressure thereto and for creating fluid vacuum therein; and
   (d) means coacting with the receptacle for alternately supplying fluids under pressure to a can placed in the receptacle and for creating fluid vacuum in the can.

3. The apparatus of claim 2, which includes:
(e) means coacting with the receptacle for observing a can placed therein.

4. The apparatus of claim 3, which includes:
(f) means coacting with the pressure supplying and vacuum creating means (c) and (d), respectively, for registering pressure and vacuum.

5. An apparatus for testing cans comprising:
(a) a fluid tight receptacle for holding a can therein, one end of the receptacle being open;
(b) a lid for sealing the open end of the receptacle, hinged to the open end;
(c) a closure cap for sealing an open end of a can placed in the receptacle, also hinged to the open end of the receptacle, the lid and cap being hinged at different places;
(d) means coacting with the receptacle for supplying liquid thereto and draining it therefrom;
(e) means coacting with the lid when it seals the open end of the receptacle, for supplying fluids under pressure to the interior of the receptacle and for creating a vacuum therein, said means alternately coacting with the closure cap when it seals the open end of a can placed in the receptacle, for supplying fluids under pressure to the interior of the can, and for creating a vacuum therein.

6. The apparatus of claim 5, which includes:
(f) means disposed in the receptacle for viewing a can placed in the receptacle.

7. The apparatus of claim 5, which includes:
(g) means coacting with the means for supplying fluid pressure and creating fluid vacuum, for registering such pressure and vacuum in the receptacle and a can placed therein, respectively.

8. The apparatus of claim 5, wherein the receptacle includes:
(1) a base;
(2) a hollow transparent cylinder mounted on the base and having one end in sealing coaction therewith;
(3) a rigid hollow casing surrounding the cylinder and having one end secured to the base, the other end extending beyond the end of the transparent cylinder, the casing having portions thereof removed forming observation windows;
(4) means disposed on the extended end of the casing, for interlocking coaction with the lid and closure cap, respectively, when the lid is in sealing coaction with the receptacle, and the closure cap is in sealing coaction with an open end of a can;
(5) a pair of spaced apart hinges disposed on the extended casing end for pivotally mounting the lid and closure cap, respectively, to its end; and
(6) means coacting between the cylinder and casing for holding the cylinder in sealing coaction with the base when the casing is secured to the base.

9. The apparatus of claim 8, wherein means are disposed on the lid and closure cap, respectively, for locking engagement with the locking means disposed on the extended casing end.

10. The apparatus of claim 9, wherein the lid and closure cap, respectively, each includes:
(1) a body portion mounted to the means for engaging the locking means on the extended casing end;
(2) a sealing head adjustably mounted to the body portion for sealing coaction with the open end of the transparent cylinder and the open end of a can, respectively; and
(3) means coacting between the body portion and the head for applying tension thereto, whereby the seal between the coacting parts is impervious to fluids.

11. The apparatus of claim 10, wherein the lid includes:
(1) a tensioning head adjustably mounted to the sealing head for coaction with a can in the receptacle to provide lateral support therefor; and
(2) means for adjusting the head to and from the sealing head whereby different sized cans are tested.

12. The apparatus of claim 11, wherein the liquid controlling means includes:
(1) a drainage port in communication with the lowest drainage point on the base within the transparent cylinder;
(2) an inlet port disposed in the base;
(3) means coacting between the drainage port and the inlet port for permitting liquid to flow therebetween;
(4) a valve coacting with the inlet port for regulating the flow of liquid thereto; and
(5) a second valve coacting with the inlet port for regulating the flow of liquid therefrom.

13. The apparatus of claim 12, wherein the fluid flow means includes:
(1) an inlet port;
(2) means coacting between the lid and inlet port for permitting fluid to flow therebetween, said means alternately coacting between the closure cap and inlet port for permitting fluid to flow therebetween;
(3) a valve coacting with the inlet port for regulating fluid pressure applied thereat; and
(4) a second valve coacting with the inlet port for regulating fluid vacuum alternately created thereat.

14. The apparatus of claim 13, which includes:
(5) a combination pressure and vacuum gauge coacting with the inlet port for alternately recording pressure and vacuum thereat.

References Cited by the Examiner
UNITED STATES PATENTS

| | | | |
|---|---|---|---|
| 1,649,287 | 11/1927 | Butler | 73—49.2 |
| 2,749,743 | 6/1956 | Foster | 73—49.3 |
| 2,880,610 | 4/1959 | McCoy | 73—49.2 |
| 2,968,178 | 11/1961 | Birkland | 73—40 |

LOUIS R. PRINCE, *Primary Examiner.*

J. NOLTON, *Assistant Examiner.*